United States Patent
Jackson

[11] Patent Number: 6,129,107
[45] Date of Patent: Oct. 10, 2000

[54] FLUID-CONTAINMENT HOSE

[76] Inventor: Robert W. Jackson, 612 Arizona St., Chula Vista, Calif. 91911

[21] Appl. No.: 09/272,136

[22] Filed: Mar. 16, 1999

[51] Int. Cl.[7] .................................. F16L 9/18; F16L 55/16
[52] U.S. Cl. .......................... 137/312; 73/40.5 R; 73/46; 73/49.1; 138/104; 138/114; 285/13; 285/123.1
[58] Field of Search .................... 73/40.5 R, 46, 73/49.1; 68/207, 208; 137/312; 138/104, 113, 114; 285/13, 14, 123.1

[56] References Cited

U.S. PATENT DOCUMENTS

| | | | |
|---|---|---|---|
| 4,644,780 | 2/1987 | Jeter | 138/104 |
| 4,667,505 | 5/1987 | Sharp | 138/114 |
| 4,836,237 | 6/1989 | McCullough | 137/312 |
| 4,930,549 | 6/1990 | Renner | 137/312 |
| 5,156,190 | 10/1992 | Staley | 138/104 |
| 5,533,760 | 7/1996 | Welch | 285/14 |
| 5,713,387 | 2/1998 | Armenia et al. | 138/114 |
| 5,884,657 | 3/1999 | Srock | 138/104 |
| 5,931,184 | 8/1999 | Armenia et al. | 137/312 |

*Primary Examiner*—George L. Walton
*Attorney, Agent, or Firm*—Frank G. Morkunas

[57] ABSTRACT

A fluid-containment hose assembly for connecting a fluid supply to a device using the fluid (such as a washing machine), the hose assembly having a first connector with a nipple; a second connector with a nipple; an inner hose sealingly attached to the nipple of the first connector at one end of the inner hose and to the nipple of the second connector at another end of the inner hose; an outer hose covering the inner hose defining a space therebetween as a relief passageway, the outer hose sealingly attached at the nipple of the first connector and at the nipple of the second connector; a relief hose attached to the outer hose, the relief hose having a relief port in communication with the relief passageway and further having an exit port through which fluid may be discharged; and a signal device on the relief hose which, when fluid enters the relief hose due to a rupture of the inner hose, generates an audible signal.

6 Claims, 1 Drawing Sheet

FLUID-CONTAINMENT HOSE

CROSS REFERENCES TO RELATED APPLICATIONS

None.

STATEMENT REGARDING FEDERALLY-SPONSORED RESEARCH OR DEVELOPMENT

Not applicable.

BACKGROUND OF THE INVENTION

This present invention relates to an improvement in hoses used to connect an object in need of fluid for use and a fluid source therefor, and more particularly to a hose which prevents spillage of the fluid in the event the hose ruptures.

Hoses to connect a fluid source to an object which uses that fluid, such as, by way of example and not limitation, a water supply source to a washing machine are routinely used in commercial and residential settings. Generally, the water supply line is open so that the machine may be immediately used. During such use, or in instances where the water supply line is kept in the open position and the machine is not in use, should the hose rupture, water will spill onto the surrounding environment generally causing damage thereto.

When a washing machine is operated, most people begin their wash cycle and generally leave the area with the washing machine unattended. The washing machine, being automatic in most cases, runs through its complete washing cycle and stops. Oftentimes the user may even completely depart the area for an extended period of time. Should the hose rupture, water will spill and cause damage. A hose which contains the spill and diverts it safely from the area would prevent the damage otherwise caused by a water spill.

Several attempts at fashioning such a hose or device have been attempted. Some have met with success but all are generally complex structures or cumbersome in application and operation. For example, U.S. Pat. No. 4,930,549 issued to Renner shows an attachment to existing hoses which has sleeves fitting over each of a washing machine's inlet hoses completely covering them. Each sleeve is joined together by an interconnecting member 26 which is attached to a drainage hose 34 directed and attached to the outlet hose of the washing machine. This attachment is well-suited for the intended purpose but complex in structure and cumbersome in application by the average consumer/user.

Similarly, U.S. Pat. No. 4,836,237 issued to McCollough is an equally structurally complex device which fits over existing plumbing fixtures to create a second passageway for water to enter and drain from a drain tube in the event the covered fixture leaks or ruptures. This, as the previously described prior art patent, is a retro-fit device adapted to fit over existing fixtures and is cumbersome to apply.

U.S. Pat. No. 5,156,190 issued to Staley relates to a hydraulic safety hose having an inner hose and an outer hose with the outer hose in fluid communication with a T-collar device. The T-collar has a valve to close off continued flow of hydraulic fluid in either direction, depending on the needs of the user. When a leak from the inner hose is detected, presumably from a rupture, the leak is automatically detected by a sensor which activates an electronically operated valve to close off the inner hose/outer hose combination from fluid communication with the T-collar. This device contemplates high pressure use for hydraulic fluids, is complex in structure, and, much like the Renner patent, equally cumbersome in application. In short, none of these prior art devices enjoys the simplicity and effectiveness of the present invention.

Accordingly, several objects and advantages of my invention are to:

a. Protect the area surrounding machines using a connector hose or similar object for connecting a fluid supply to the machine.

b. Provide a simple and inexpensive fluid connector for such machines.

c. Provide an easy-to-use and easy-to-install fluid connector and protector.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates. A hose assembly for connecting a fluid supply to a device using the fluid, the hose assembly comprising a first connector having a nipple; a second connector having a nipple; an inner hose sealingly attached to the nipple of the first connector at one end of the inner hose and to the nipple of the second connector at another end of the inner hose; an outer hose covering the inner hose defining a space therebetween as a relief passageway, the outer hose sealingly attached at the nipple of the first connector and at the nipple of the second connector; a relief hose attached to the outer hose, the relief hose having a relief port in communication with the relief passageway and further having an exit port through which fluid may be discharged; and a signal device on the relief hose which, when fluid enters the relief hose due to a rupture of the inner hose, generates an audible signal.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
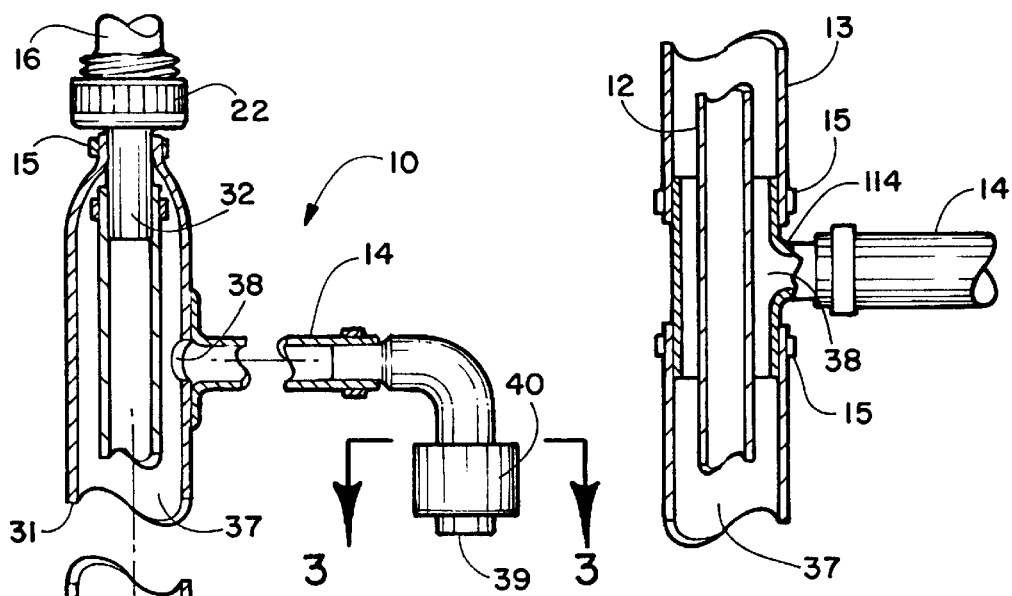
FIG. 1 is cut-away view of the containment hose.

Referring now to the drawings in detail and in particular to FIG. 1, reference character 10 generally designates a containment hose assembly constructed in accordance with a preferred embodiment of the present invention. It has an inner hose 12 connected to the nipple 32 of a cap 22 at one end of the inner hose 12. The inner hose 12 is connected to the nipple 34 of a cap 24 at the other end of the inner hose 12. The caps are conventional caps adapted to connect to an inlet 16 of a device or machine requiring the fluid at one end and to a fluid supply source 18 at the other end. Connection may be snap-on, bayonet-type, or threaded.

An outer hose 13 covers the inner hose 12 from end to end and attaches to the nipples 32, 34 at the respective ends. Such attachment may be by bonding on manufacture or by clamping devices 15 suited for the intended purposes. The inner hose 12 may be completely covered by the outer hose 13, in which case if clamps 15 are used, a single clamp 15 will suffice at each end. In addition, each hose may be individually clamped to the respective nipples 32, 34 as illustrated at the fluid source supply 18 end of the containment hose assembly 10. The preferred method, however, is bonding or a single clamp.

A relief hose 14 is connected to a wall 31 of the outer hose 13 defining a relief port 38 and the point of connection. Distal from the relief port 38 is an exit port 39 on the relief hose 14 for drainage of fluid should the inner hose 12 rupture. A relief passageway is defined by the space between the outer surface of the inner hose 12 and the inner surface of the outer hose 13 and the inner surface of the relief hose 14. The exit port 39 should be positioned in or adjacent to a suitable drain or stand pipe.

Figure 2:
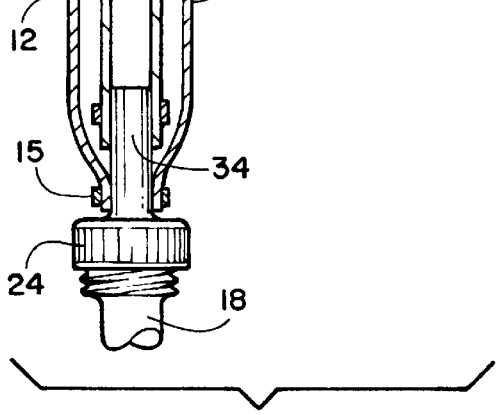
FIG. 2 is a partial cut-away view of another embodiment of the containment hose.

Another form of connecting the relief hose 14 to the outer hose 13 is illustrated in FIG. 2. Here a conventional T-fitting 114 or Y-fitting (not shown) or the like inserts at two points (such as the top of the "T") into the inner surface of the outer hose over the inner hose 12 and is held sealingly thereat by clamp-like devices 15. The relief hose 14 is connected to the extension of the T-connector also by clamp-like devices 15.

In operation with either embodiment, should the inner hose 12 rupture, fluid will be contained by the outer hose 13 and will fill the relief passageway of the inner hose 12 and the outer hose 13. The fluid will then enter the relief hose 14 via the release port 38 and out the exit port 39 and harmlessly down and out a suitable drain thereby protecting the surrounding environment of the user.

Figure 3:
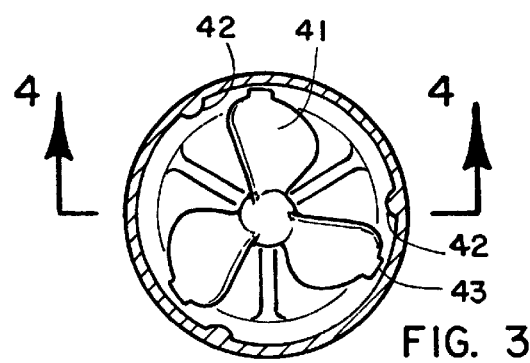
FIG. 3 is a cross-sectional view as taken on line 3—3 of FIG. 1.
Figure 4:
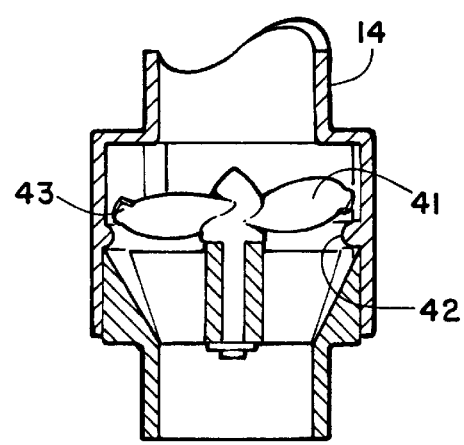
FIG. 4 is a cross-sectional view as taken on line 4—4 of FIG. 3.

The containment hose assembly 10 also has a signal device 40 which, when the inner hose 12 ruptures and fluid flows through and out the relief hose 14, a signal is generated signifying that a leak is in progress. FIGS. 3 and 4 illustrate in detail one embodiment of such a signal device. This signal device has a turbine-like member or propeller with angled blades 41 angled in such a manner that, as fluid passes over the blades 41, the blades 41 turn or spin. On the outer ends of the blades 41 are flap-like members 43. These flap-like members 43 are somewhat stiff and extend outward such that they are adjacent to the inner surface of the outer perimeter of the signal device 40.

On the inner surface of the outer perimeter of the signal device 40 are detents, nubs, or protuberances 42. As the propeller blades 41 spin, the flap-like members 43 thereon pass on and over the nubs 42. The flap-like members 43, being somewhat stiff, are bent back slightly as they engage the nubs 42. As they pass over the nubs 42 the flap-like members retract and make an audible snapping or clicking sound. As the blades 41 spin faster, the noise generated becomes more frequent and louder. The nubs 42 may also be on the outer ends of the blades 41 in which case the flap-like members 42 would be positioned on the inner surface of the outer perimeter of the signal device 40. In the preferred embodiment, this signal device is best positioned adjacent to the exit port 39 of the relief hose 14 though it may be positioned at any point thereon and still function as desired.

Figure 5:
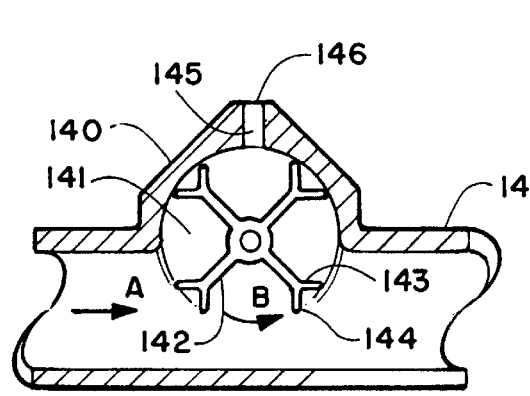
FIG. 5 is a cross-sectional detailed view of another embodiment of a signal device on the containment hose.

Another embodiment of the signal device 140 is illustrated in FIG. 5. In this embodiment, preferred placement of this signal device 140 is on top of the relief hose 14 such that fluid flow is below the signal device 140. This signal device 140 is constructed of a paddle wheel-like member 141 having one or more blades 142 which rotate in the direction of Arrow B as fluid travels in the direction of Arrow A. At the outer ends of each blade 142 are two opposing fins, a leading fin 143 and a trailing fin 144. The center of the paddle wheel 141 is aligned with or above the inner surface of the relief hose 14. A cavity or chamber 145 is defined in a space above the perimeter of rotation or upper arc of the paddle wheel 141. As the paddle wheel 141 rotates, air is forced by the leading fin 143 into the chamber 145. As air fills the chamber 145 it is then forced out a slit 146 on the signal device 141 thereby creating an audible whistle-like sound. The more the paddle wheel 141 spins, the more sound that is generated thereby alerting a user to a rupture.

The present disclosure includes that contained in the present claims as well as that of the foregoing description. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A hose assembly for connecting a fluid supply to a device using the fluid, the hose assembly comprising
   a. a first connector having a nipple;
   b. a second connector having a nipple;
   c. an inner hose sealingly attached to the nipple of the first connector at one end of the inner hose and to the nipple of the second connector at another end of the inner hose for communicating the fluid therethrough;
   d. an outer hose covering the inner hose defining a space therebetween as a relief passageway for any leaking fluid, the outer hose sealingly attached at the nipple of the first connector and at the nipple of the second connector;
   e. a relief hose attached to the outer hose, the relief hose having a relief port in communication with the relief passageway and further having an exit port through which the leaking fluid may be discharged; and
   f. signal means for producing a signal when the leaking fluid passes from the relief port to the exit port, the signal means connected to the relief hose, said signal means comprising a turbine member having outer ends, the turbine member adjacent to the exit port of the relief hose, and one or more flaps on an inner wall of the relief hose adjacent to the exit port such that as the turbine member rotates, the outer ends of the turbine member strike the one or more flaps creating an audible signal as the leaking fluid passes through the turbine member and out the exit port.

2. A hose assembly for connecting a fluid supply to a device using the fluid, the hose assembly comprising a. a first connector having a nipple;
   b. a second connector having a nipple;
   c. an inner hose sealingly attached to the nipple of the first connector at one end of the inner hose and to the nipple of the second connector at another end of the inner hose for communicating the fluid therethrough;
   d. an outer hose covering the inner hose defining a space therebetween as a relief passageway for any leaking fluid, the outer hose sealingly attached at the nipple of the first connector and at the nipple of the second connector;
   e. a relief hose attached to the outer hose, the relief hose having a relief port in communication with the relief passageway and further having an exit port through which the leaking fluid may be discharged; and
   f. signal means for producing a signal when the leaking fluid passes from the relief port to the exit port, the signal means connected to the relief hose, said signal means comprising a turbine member on an upper wall of the relief hose in rotating communication with the leaking fluid passing through the relief hose and an air signal device above the turbine member such that as the turbine member rotates air is forced upward to and through the air signal device thereby emanating an audible signal.

3. The invention as defined in claim 2 wherein the turbine member comprises blades having at an outer end of the blades a leading fin and a trailing fin, the leading fin and the trailing fin angled in opposing directions from each other between about 1 degree and 75 degrees as measured from the outer end of the blade.

4. The invention as defined in claim 3 wherein the leading fin and the trailing fin are resilient.

5. A hose assembly for connecting a fluid supply to a device using the fluid, the hose assembly comprising a. a first connector having a nipple;
   b. a second connector having a nipple;
   c. an inner hose sealingly attached to the nipple of the first connector at one end of the inner hose and to the nipple of the second connector at another end of the inner hose for communicating the fluid therethrough;
   d. an outer hose covering the inner hose defining a space therebetween as a relief passageway for any leaking fluid, the outer hose sealingly attached at the nipple of the first connector and at the nipple of the second connector;
   e. a relief hose attached to the outer hose, the relief hose having a relief port in communication with the relief passageway and further having an exit port through which the leaking fluid may be discharged; and
   f. signal means for producing a signal when the leaking fluid passes from the relief port to the exit port, the signal means connected to the relief hose, said signal means comprising a turbine member having outer ends, the turbine member adjacent to the exit port of the relief hose, and one or more nubs on an inner wall of the relief hose adjacent to the exit port such that as the turbine member rotates the outer ends of the turbine member strike the one or more nubs creating an audible signal as the leaking fluid passes through the turbine member and out the exit port.

6. The invention as defined in claim 5 wherein the outer ends of the turbine member further comprise resilient flaps such that, when the flaps strike the one or more nubs, an audible signal is created as fluid passes through the turbine member and out the exit port.

\* \* \* \* \*